A. H. ALVERSON.
Hook.

No. 159,374.

Patented Feb. 2, 1875.

UNITED STATES PATENT OFFICE.

ANDREW H. ALVERSON, OF NEW HAVEN, CONNECTICUT.

IMPROVEMENT IN HOOKS.

Specification forming part of Letters Patent No. 159,374, dated February 2, 1875; application filed December 26, 1874.

*To all whom it may concern:*

Be it known that I, ANDREW H. ALVERSON, of New Haven, in the county of New Haven and State of Connecticut, have invented a new Snap-Hook; and I do hereby delare the following, when taken in connection with the accompanying drawings and the letters of reference marked thereon, to be a full, clear, and exact description of the same, and which said drawings constitute a part of this specification, and represent in—

Figure 1:
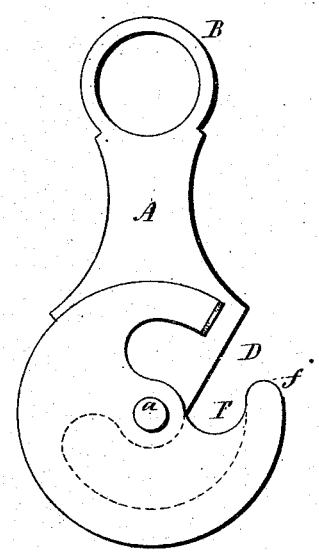
Figure 3:
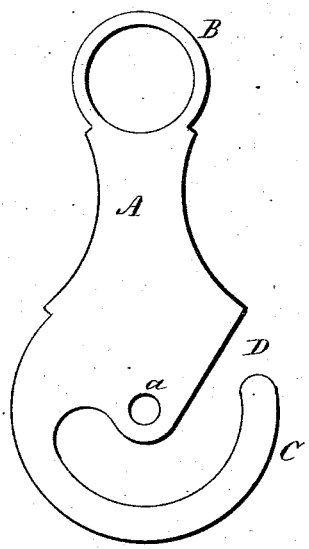
Figure 2:
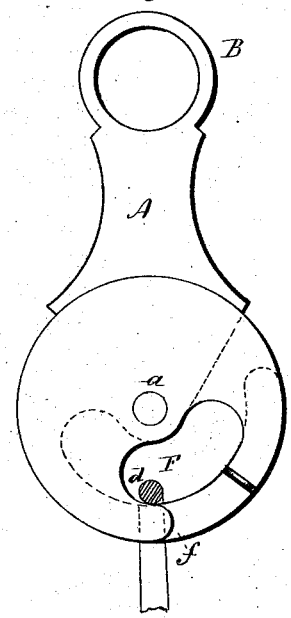
Figure 4:
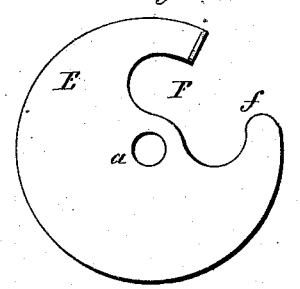

Figure 1, side view, the hook open; Fig. 2, the same, the hook closed; Figs. 3 and 4, the two parts separate.

This invention relates to an improvement in that class of snap-hooks which are mechanically closed, in contradistinction to the class which are closed by a spring, this hook designed more especially for a suspending-hook, as for bird-cages, lamps, &c., the object being to produce a hook which is left open by the removal of the thing engaged, and closed by the weight or power of the thing in the act of attachment. The invention consists in a disk pivoted to the body of the hook proper, with a recess opening from the periphery and corresponding to the opening of the hook, when the disk is turned, to bring the recess in the disk to the opening of the hook, so that the recess in the disk will receive the thing to be attached, and the weight or force of the said thing coming directly upon the disk causes it to turn and close the opening of the hook as the said thing passes into the hook, as more fully hereinafter described.

A is the one part or body of the hook. (See Fig. 3.) This is formed with an eye or loop, B, by which to attach or suspend the hook, substantially as for other snap-hooks. The hook C is formed preferably concentric, with the point or center $a$ with the mouth D, opening upward, as seen in Fig. 3. E is the locking-disk, (see Fig. 4,) corresponding to hook D, and pivoted to the body at the center $a$, so as to turn freely thereon. In this disk is a recess, F, with an opening, $f$, to the circumference. When the disk is turned to bring the opening $f$ into conjunction with the mouth D of the hook, as in Fig. 1, the hook is open. In this condition, the loop-ring or whatever it may be is passed into the recess F, the lower end of the recess being above the vertical central line; hence, when the thing to be suspended is left free or force applied thereto, it will serve to turn the disk until the ring or loop comes down to near the vertical central line, as in Fig. 2, $d$ denoting the ring. This brings the opening $f$ down below the end of the hook C, and closes the mouth, as seen in Fig. 2. To open the hook, turn the disk back, to bring the opening $f$ and the mouth D together, as in Fig. 1.

The advantage of this hook over the usual snap-hook is, that when suspended so high as to be inconvenient to reach, the hook will be left open by the removal of the thing suspended, hence it need not be touched by the hand when replacing the thing thereon, and has the advantage over open hooks that it is impossible for the thing suspended to be accidentally removed.

I claim—

The body A, having the hook C and eye B as a part thereof, combined with the concentric disk E, pivoted thereto, and constructed with the recess F and opening $f$, substantially as described.

ANDREW H. ALVERSON.

Witnesses:
JOHN E. EARLE,
C. V. FORBES.